(No Model.)
T. C. FLEMING.
FOLDING HARROW.
No. 594,837.                    Patented Nov. 30, 1897.
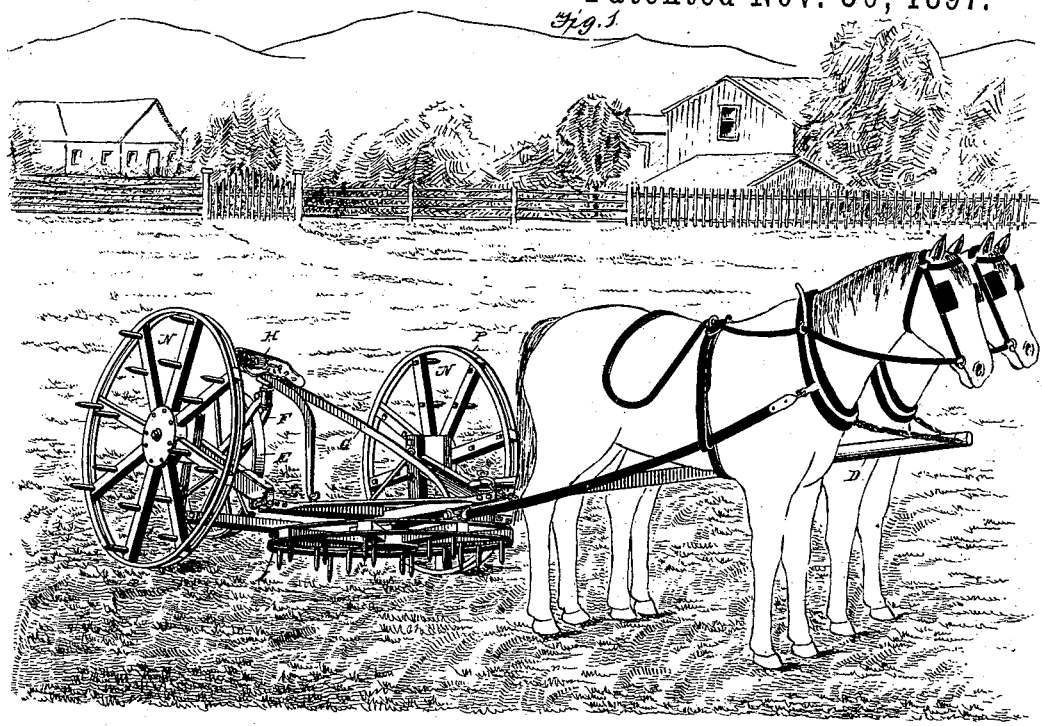
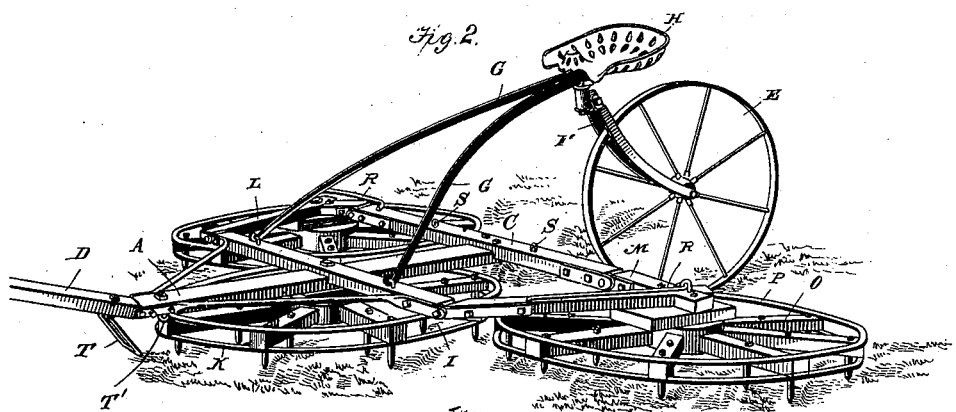
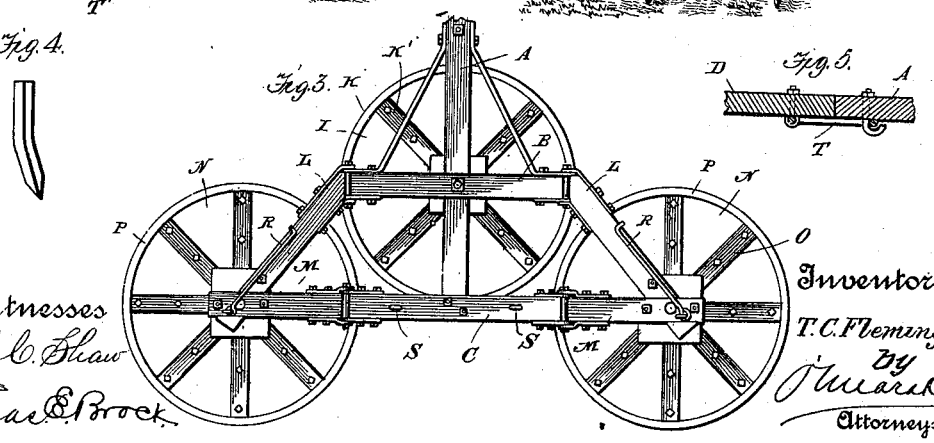
Witnesses
J. C. Shaw
Chas. E. Brock
Inventor
T. C. Fleming,
by
Attorneys
THE NORRIS PETERS CO., PHOTO-LITHO., WASHINGTON, D. C.

UNITED STATES PATENT OFFICE.

THOMAS C. FLEMING, OF AYR, NEBRASKA.

FOLDING HARROW.

SPECIFICATION forming part of Letters Patent No. 594,837, dated November 30, 1897.

Application filed November 18, 1896. Serial No. 612,587. (No model.)

*To all whom it may concern:*

Be it known that I, THOMAS C. FLEMING, residing at Ayr, in the county of Adams and State of Nebraska, have invented a new and useful Folding Harrow, of which the following is a specification.

This invention relates generally to harrows, and more particularly to a folding harrow, the object being to construct the harrow in such a manner that it can be easily moved to and from the field when desired.

Another object is to provide a harrow the teeth of which will be self-cleaned, and another object is to provide a harrow which is so constructed that the circular side sections can be turned up to provide wheels upon which the harrow can be transported from place to place.

With these various objects in view my invention consists, essentially, of a main frame having side wings or sections, the main frame having one or more harrow-sections attached thereto, the side wings or sections each having a circular harrow pivoted thereto, which circular sections are adapted to be folded up and used as wheels for transporting the machine, when so desired.

The invention consists also in certain details of construction and novelties of combination, all of which will be fully described hereinafter and pointed out in the claims.

In the drawings forming a part of this specification, Figure 1 is a view showing the practical application of my invention, the side sections of the harrow being turned up and used as wheels. Fig. 2 is a perspective view of the harrow, the side sections being turned down and used as a harrow. Fig. 3 is a top plan view.

In carrying out my invention I employ a main frame which comprises the central beam A, the front beam B, and the rear beam C, said front and rear beams being rigidly attached to the central longitudinal beam, as most clearly shown, and pivotally attached to the forward end of the central beam A is a draft tongue or pole D.

A large caster-wheel E is arranged to the rear of the main frame in a fork F, which fork is pivotally connected with the side supporting-bars G, the seat H being fixed to the rear or upper ends of the said bars, the lower or forward ends being detachably connected to the front cross-beam B, as most clearly shown in Fig. 2.

A circular harrow-section I is pivoted to the bottom of the main frame where the front and central beams cross each other, said section comprising the tooth-bars K' and the circular rim K, said tooth-bars being provided with any desired construction of teeth; but in practice I prefer to have the lower end thereof bent so that the said lower end will engage the earth as the harrow is drawn, and consequently revolve the circular section, and by doing so the teeth will be brought into direct engagement with the earth during one half of the revolution, but will smooth the earth during the remaining half of the revolution, and consequently said teeth will be cleaned.

The side wings or sections are hinged to the main frame, said side wings consisting of the side beams L and the rear-beam sections M, said beams L and M crossing each other, as shown, the beam L being hinged at its forward end to the beam B, while the rear beam M is hinged at its inner end to the beam C, as most clearly shown in Fig. 3.

Circular harrow-sections N are pivotally attached to the side wings or sections where they cross each other, said harrow-sections consisting of the rotating tooth-bars O and the circular rim P, the tooth-bars O being preferably provided with the same description of teeth as the forward harrow-section.

Brace-rods R are pivotally attached to the side sections, preferably near the outer end of the beam M, the inner end of said rods being hooked and adapted to engage the eyes S, arranged upon the upper face of the rear beam C, near the center of the same, the purpose of said rods and eyes being to hold the side wings or sections in a vertical position whenever it is desired to utilize the circular side harrows as wheels, as most clearly shown in Fig. 1, the rims of the said circular harrows being made particularly strong for this purpose, and whenever it is desired to transport the harrow to or from the field the side wings or sections are turned up and secured and the side harrows used as wheels, and in order to elevate the central harrow-section I employ a bail T, which is pivotally attached to the under side of the tongue or pole and is adapted to engage a hook T', arranged upon the under side of the central beam near the forward end, and by lifting the said beam slightly and bringing the bail into engagement therewith the main frame, and consequently the central section of the harrow, is slightly elevated, so that said harrow will clear the earth and the teeth will not come in contact with the ground while the harrow is being transported or rolled upon the side sections.

The central section can be constructed in any desirable manner, and, if desired, more than one section can be employed.

Furthermore, it will be understood that the principles of my invention can be utilized upon the harrows now in use by simply attaching the side wings or sections to the ordinary harrow-frame and providing said side wings or sections with circular harrow-sections.

It will thus be seen that I provide an exceedingly cheap and simple construction of folding harrow, one which can be quickly and easily transported to and from the field, and one in which the circular side sections can be utilized for supporting-wheels.

Having thus described my invention, what I claim as new, and desire to secure by Letters Patent, is—

1. A folding harrow comprising a main frame consisting of a central beam and a front and rear cross-beam, a circular harrow-section pivoted under the front cross-beam, and wings, each consisting of a side beam and rear beam, the front end of the side beam being hinged to the front cross-beam of the main frame, and the rear beam to the rear cross-beam, and a circular harrow-section pivoted to the under side of the wings at the juncture of their beams, and means for locking the wings in a vertical position, substantially as described.

2. A folding harrow consisting of a main frame formed of a central beam and two cross-beams, a circular harrow-section pivoted under the front cross-beam, wings, each formed of an inclined side beam and a rear beam, the side beam and a rear beam, the side beam being hinged at its front end to the end of the front cross-beam and the rear beam to the end of the rear cross-beam, a circular harrow-section pivoted to the under side of each wing at the juncture of its beams, supporting-bars secured to the front cross-beam of the main frame, a seat on the rear ends of the supporting-bars, a fork secured to the said supporting-bars, and a caster-wheel mounted in the said fork, substantially as herein shown and described.

THOMAS C. FLEMING.

Witnesses:
CHARLES G. LANE,
W. S. DUER.